(No Model.)
J. P. CALLAN.
SADDLE FOR VEHICLE SPRINGS.
No. 280,910. Patented July 10, 1883.
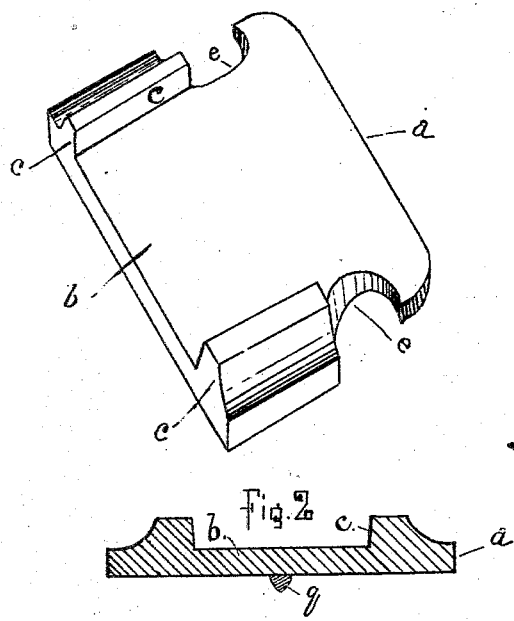
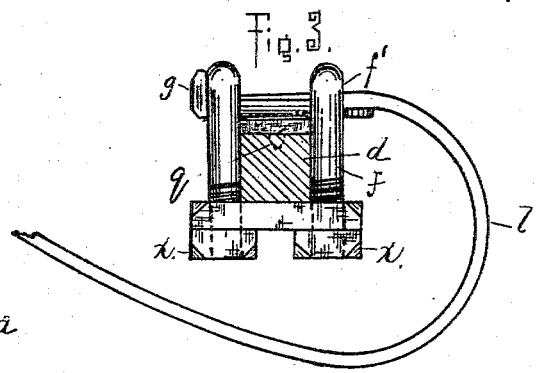
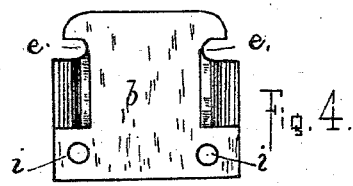
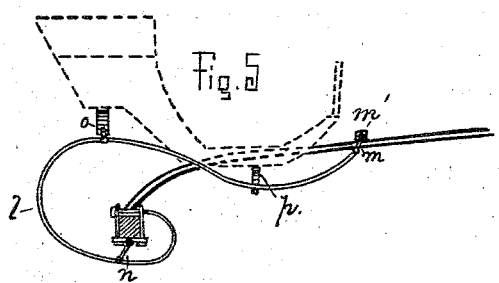
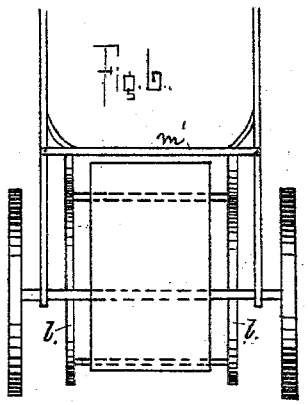
WITNESSES
John Porter Callan, INVENTOR
by John J. Halsted Son
his ATTORNEYS

UNITED STATES PATENT OFFICE.

JOHN P. CALLAN, OF AURORA, ILLINOIS.

SADDLE FOR VEHICLE-SPRINGS.

SPECIFICATION forming part of Letters Patent No. 280,910, dated July 10, 1883.

Application filed March 16, 1883. (No model.)

*To all whom it may concern:*

Be it known that I, JOHN PORTER CALLAN, of Aurora, in the county of Kane and State of Illinois, have invented certain new and useful Improvements in Saddles or Shoes and other Connections for Vehicle-Springs; and I do hereby declare that the following is a full, clear, and exact description of the invention, such as will enable others skilled in the art to which it appertains to make and use the same, reference being had to the accompanying drawings, and to letters of reference marked thereon, which form a part of this specification.

My invention relates in part to a peculiarly-constructed saddle, bolster, or shoe by means of which, in connection with the clips, the springs of the vehicle may be kept squarely to their positions upon the axle, and in part to other devices connected with the springs, all which will be clearly understood from the following description and from the drawings, in which—

Figure 1 represents in perspective an enlarged view of my improved saddle, bolster, or shoe; Fig. 2, a cross-section of the same; Fig. 3, the saddle in its proper position relatively to the clips, axle, and spring; Fig. 4, a saddle having the same leading features, but slightly varied and of reduced size; Fig. 5, the saddle and springs in position, partly in section, as applied to a road-cart, and Fig. 6, a plan of a vehicle simply, the better to show the relative positions of some of the parts.

It may be premised that while the drawings show my peculiarly-constructed saddle with relation to but one style of spring, yet it is equally useful with many other styles which may be secured by means of a clip, and the saddle may be made of gray, malleable, or wrought iron, or of any other appropriate metal.

The saddle, bolster, or shoe $a$ is a single piece, having in its top a recess, $b$, adapted to receive the spring, the edges of the spring snugly fitting against the vertical or upright side walls, $c$, of such recess. The under face of the saddle should be adapted to lie firmly upon the axle $d$, and preferably should be flat to adapt it to a flat-top surface of an axle. Its breadth between the two yokes of the clip should be such that when the clip is tightened up by the usual nuts the saddle may lie snugly between the clips without any tendency to shift position relatively to them. Each saddle is also provided with notches $e\ e$ to admit the legs $f$ of one of the yokes $f'$ of the clip, and, as hereinafter stated, with a dowel or projection on its under side adapted for a small hole or cavity in the axle. The spring should preferably have an upturned end, as shown at $g$, to bear against the yoke. It will now be readily seen that when the spring is inserted in its place, and that part of it which is to be held by the clip is first lodged in the recess $b$ and the nuts $x$ turned to properly tighten up the clip upon the axle, the same act of tightening tightly clamps the spring to the saddle $a$ and the saddle to its true position in the clip, the saddle being thus positively prevented from any lateral movement or turning because of the yokes and the notches, and the spring being positively prevented from any similar movement relatively to the saddle because of the walls of the recess $a$. The spring is thus kept squarely in its correct position. The upturned end $g$ prevents the rear yoke or clip from slipping back, while that part of the bolster which is forward of the front yoke or clip prevents such front clip from slipping forward, thus locking the spring to the axle when the nuts are screwed up tight, the flat and level under surface of the spring resting squarely and firmly on the flat level surface of the recess $c$, and the flat under surface of the bolster $a$ resting on the flat surface of the axle, and so that when clipped or bound together they are practically as if solid.

Instead of having the notches $e\ e$ alone to receive one of the clip-yokes, the saddle may also have holes $i\ i$ drilled in its two corners, as shown in Fig. 4, and through which the other yoke may pass. In some cases this may be desirable, as affording additional security against any possible shifting of the position of the saddle under extreme circumstances. Of course the saddle would need to be made somewhat wider to furnish the material through which the holes are to be drilled.

Holes may be used instead of notches $e\ e$.

While my improvements are applicable to carriages generally, they are peculiarly suitable for two-wheeled vehicles or road-carts, or any other vehicle in which both front and back springs are not used, and for the evident reason that there is greater liability to lateral shifting or turning of the springs when the body of the vehicle does not rest upon springs both at its front and at its rear.

The spring $l$ at that part which is secured to the axle is very similar in its form to that shown in my Patent No. 260,742, dated July 11, 1882, and upon which my present invention is an improvement. The other part of the spring I prefer to make, however, of a form different from that shown in said patent, and I connect it with the body of the cart or vehicle in a different manner. At or near its forward end it is provided with a shackle, $m$, connecting it to the bar $m'$, which connects the thills, and in some cases also with another shackle, $n$, beneath the axle or attached to the axle itself. The shackles $m$ are simply a continuation of the side springs, $l$, and they serve the double purpose of providing a yielding fastening for the springs where each is connected to the cross-bar of the cart, and also of very materially lessening the horse-motion of the cart.

The body of the cart at its rear is supported on a cross-spring, the position of which is indicated at $o$, each end of such cross-spring being secured to one of the side springs by means of a shackle, in a well-known manner. This cross-spring may be of any ordinary construction.

The front end of the cart-body is supported by a cross-bar or cross-spring, $p$, the ends of this cross-bar or cross-spring being clipped or connected to the side springs, $l$, by means of ordinary clips or shackles. This cross-bar or cross-spring is not framed into nor in any manner fastened to the thills or shafts, but is supported by the side springs and located directly under the front of the body, about midway between the seat and the dash-board. The front of the body is not attached to the front cross-bar or thills except by means of a safety-strap, so that in case a spring should break the body will still be sustained by such strap.

On the lower side of the bolster $a$ is a projecting or tapering dowel, $q$, adapted to enter a corresponding cavity made in the top of the axle. This provision affords an additional security against accidental displacement and also prevents the clips from becoming shifted along the axle.

Instead of placing the axle beneath the saddle, it may be placed above it, the spring in such case being secured beneath the saddle—in other words, these connected parts are simply inverted, but retain the same positions relatively to each other. In such case the shape of the spring at its rear portion would be altered to accord with this altered position.

I claim—

1. The saddle $a$, as made with a flat under surface, provided with a projecting pin, $q$, with a flat upper surface having side ledges and a projecting portion made without side ledges and provided with notches or holes, all as shown and described, and for the purposes set forth.

2. In combination with the saddle $a$, as made with its flat upper and lower surfaces, recess, side ledges, projection portion, holes or notches, and pin $q$, the axle having a cavity for this pin, and the yokes $f$ and fastening devices serving to hold the plate or saddle to the axle and the spring to the saddle, all substantially as shown and described.

3. In combination, the bolsters $a$, made as described, the axle and clips, and the side springs, attached to the vehicle by means of a shackle at or near their forward end.

JOHN PORTER CALLAN.

Witnesses:
 A. J. KING,
 M. O. SOUTHWORTH.